(12) United States Patent
Wu

(10) Patent No.: US 8,316,764 B1
(45) Date of Patent: Nov. 27, 2012

(54) APPARATUS AND METHOD FOR ADDING A REGISTERED IMAGE ON A SHEETED SUBSTRATE

(76) Inventor: Teh Ming Eric Wu, Shanghai (CN)

( * ) Notice: Subject to any disclaimer, the term of this patent is extended or adjusted under 35 U.S.C. 154(b) by 647 days.

(21) Appl. No.: 12/471,020

(22) Filed: May 22, 2009

Related U.S. Application Data

(60) Provisional application No. 61/128,491, filed on May 22, 2008.

(51) Int. Cl.
*B41C 1/06* (2006.01)
*B41F 1/34* (2006.01)
*B41F 3/08* (2006.01)
*B29D 11/00* (2006.01)
*B29C 65/00* (2006.01)

(52) U.S. Cl. .......... 101/34; 101/481; 101/483; 101/486; 264/1.34; 156/229

(58) Field of Classification Search .......... 101/34, 101/481, 483–485; 264/1.31, 1.34, 1.35, 264/1.36, 1.38, 1.6, 1.7, 2.6, 2.7; 156/229, 156/351, 360, 362–364, 406, 538, 539, 556, 156/580–582

See application file for complete search history.

(56) References Cited

U.S. PATENT DOCUMENTS

| | | | |
|---|---|---|---|
| 3,758,649 A * | 9/1973 | Frattarola | 264/1.33 |
| 4,758,296 A * | 7/1988 | McGrew | 156/231 |
| 4,840,757 A * | 6/1989 | Blenkhorn | 264/485 |
| 4,933,120 A | 6/1990 | D'Amato et al. | |
| 5,003,915 A | 4/1991 | D'Amato et al. | |
| 5,116,548 A * | 5/1992 | Mallik et al. | 264/1.34 |
| 5,558,740 A * | 9/1996 | Bernard et al. | 156/231 |
| 6,775,036 B2 | 8/2004 | Cox et al. | |
| 6,957,160 B2 * | 10/2005 | Miller et al. | 702/94 |
| 2010/0276076 A1* | 11/2010 | McDonnell et al. | 156/247 |

OTHER PUBLICATIONS

U.S. Appl. No. 12/125,631, filed May 22, 2008, Wu.

* cited by examiner

*Primary Examiner* — Daniel J Colilla
*Assistant Examiner* — Marissa Ferguson Samreth
(74) *Attorney, Agent, or Firm* — Drinker Biddle & Reath LLP

(57) ABSTRACT

An apparatus and method for preparing a sheeted substrate with a registered structured image in which a resin coated sheeted substrate is provided in the form of a series of spaced sheets with leading or trailing edges acting as reference positions along with a master web with structured images and registration marks. Reference positions of the series of spaced sheets are aligned with the registration mark on the master web and the master web is nipped to the coated sheeted substrate after which curing energy is applied through the master web to the resin coat while the master web and sheeted substrate are in contact. Then the master web is separated from the sheeted substrate to leave a structured image on the sheeted substrate. Registration between the sheeted substrate and the master web may be maintained by varying the relative speed of the master web and the sheeted substrate through stretching of the master web.

16 Claims, 10 Drawing Sheets

APPARATUS AND METHOD FOR ADDING A REGISTERED IMAGE ON A SHEETED SUBSTRATE

CROSS-REFERENCE TO RELATED PATENT APPLICATIONS

This patent application claims the benefit of U.S. Provisional Patent Application No. 61/128,491, filed May 22, 2008.

FIELD OF THE INVENTION

This invention relates to a method and a device for applying structured images onto a sheeted substrate and, more specifically, to a method of using a master web to apply structured images onto a sheeted substrate in registration with one or more printed images on the individual sheets of the sheeted substrate in a rapid, accurate and efficient way.

BACKGROUND OF THE INVENTION

Holographic, diffractive, and 3D structured images have been used in conjunction with printing applications to capture the visual attention of the viewer by producing enhanced visual effects via light refraction depending on the viewing angle. Holographic images can also provide different viewing effects such as flip or 3-dimensional images. Today, however, the marketplace demands more sophisticated integration between structured images and associated conventional printing. Although registration of random structured images to printing requires only controls between the tooling and the printing, registration of non-random structured images to printing requires precise control between the tooling, the structured images and the printing. This is a particularly difficult challenge when the non-random images are applied to a substrate made up of a series of individual sheets (a "sheeted substrate"). For example, while non-random holographic designs are often used as a higher level security feature to produce printed matter with registration between meaningful structured images and printing on continuous webs, producing such product in a sheeted substrate currently is costly and difficult.

Conventional processes for applying structured images onto resin/film substrates are subject to substrate distortion due to the substantial heat required to emboss the image into the film. Also, current systems for producing printing in registration with diffractive or holographic images on a laminated sheeted substrate often encounter problems such as displayed shim lines and missed registration. These problems may be caused by sheeting after lamination, by holographic material distortion, or by various tensions produced in the holographic material when it is made by conventional processes.

Systems for laying down holographic and other embossed images into a layer of liquid resin by using a master film or master cylinder and then curing are also known. However, this approach has been used only for embossing holographic images with random designs into the uncured resin on the sheet or web substrate and not where registration between the printing and non-random holographic images on the master web is required.

Casting and registering a holographic image by heat embossing holographic flexible film to a pre-printed sheeted substrate also produces misalignment between the printing on the substrate sheet and the cast holographic images from the master web due to inconsistent spacing between registration marks. Furthermore, inconsistent spacing during sheeted substrate transport also occurs after the substrate sheet was registered coated which amplifies the difficulty of registration between the printing and the non-random holographic images.

While these problems are exacerbated when the system is run at high speed, they sometimes can be resolved by casting multiple times with a different master web combined with spot application. However, multiple casting with a different master web in selected areas will produce reduced rub resistance in non-casting areas if more than one random design is chosen for casting at the selected area. In addition, there will be discernable differences in gloss on the printed layer between cast and non-cast areas. Such gloss and rub resistance concerns arise, for example, in sheet material produced in accordance with the system of U.S. Pat. No. 5,003,915.

My U.S. patent application Ser. No. 12/125,631 entitled "Method for Transferring Holographic and Other Microstructure or Refractive Images Onto a Web-Carried Resin Coating in Registration with Printing on the Web" filed May 22, 2008 describes, inter alia, apparatus and methods for producing holographic images on a continuous shrink film web through a master web application. However, this patent application focuses on registration between the master film and the web substrate by stretching the shrink film web to match the repeat length of the images on the master web. So, the repeat length of the master web must be shorter than the repeat length of each printed image on the shrink film web. In contrast, the present sheeted substrate system calls for different (and unique) approaches to address the spacing between the individual sheets of the sheeted substrate.

U.S. Pat. Nos. 4,933,120; 5,003,915; and 6,775,036 describe apparatus and methods for producing holographic patterns by using a master cylinder or master film to apply an embossed image against a coated substrate web. However, apparatus described in these patents are severely limited as to substrate thickness and registration between printed images on the web substrate and the images on the master cylinder. This is because, inter alia, the dancer roll mechanism used cannot compensate for the accumulating difference in image spacing on the substrate due to web distortion caused by tension, moisture and temperature changes. In addition, the dancer roll can only be used on web substrates and not with sheet substrates as described in the current invention. Finally, U.S. Pat. Nos. 4,933,120 and 5,003,915 transfer liquid resin from a relief mold.

Therefore, if a system were available that could achieve accurate registration of structured images on a sheeted substrate at high speed that could accommodate different images, that eliminated seam lines, and that eliminated the difference in gloss and rub resistance, particularly significant contributions to the art would be at hand.

SUMMARY OF THE INVENTION

The present invention constitutes such an advance in the art. It employs a master web carrying a structured image that can be any length desired, with repeating structured images regularly spaced along the master web. The master web is nipped (or "embossed") by a pressure roller and impression cylinder against the surface of a sheeted substrate to which an energy curable resin coating has been applied thereby embossing the structured image into the coating. After the image is embossed, the coating is cured and the final sheeted product is collected and used as desired.

This system may be used in-line with a sheet UV printing system that applies printing to a sheeted substrate, ahead or after the resin application, or that applies printing both before and after the resin application to the sheeted substrate. Also, the resin application system may be used in a stand-alone fashion where printing is applied to the sheeted substrate in advance of the coating, and optionally at a remote location. Also, printing may be applied downstream to one or both sides of the sheeted substrate including optionally overprinting a previously cured resin coating containing structured images.

In the practice of this invention, a series of registration marks are applied to the master web and optionally to each sheet of the sheeted substrate. The registration marks on the master web may be rectangles, cross hairs, bull eyes, etc. For the sheeted substrate, however, it is preferred to rely on the leading and/or trailing edges of each sheet of the sheeted substrate as reference positions corresponding to registration marks. Also, fixed locations on the conveying device (gripper, angle of impression cylinder, etc.) may also be relied upon as "registration marks" for the sheets of the sheeted substrate. The registration marks on the master web and the reference positions of the sheets of the sheeted substrate as reflected in the leading/trailing edges or the registration marks of the sheeted substrate must be aligned before the master is nipped to the resin coating on the sheeted substrate to ensure accurate registration between the structured images in the master web and the printing on the sheeted substrate.

The present invention accomplishes registration in one embodiment with a unique fine-tuning step in which the line speed of the uncured resin-coated and pre-printed sheeted substrate is adjusted to maintain proper registration of the structured image on the master web and the printing on the sheets of the sheeted substrate. This can be accomplished by using separate servo motors to control the line speed of the impression cylinder and the conveying mechanism for the uncured sheeted substrate.

In another embodiment, the fine-tuning step comprises varying the line speeds of the impression cylinder and the sheeted substrate to ensure proper registration of the structured images and the printing on the sheets of the sheeted substrate. This on-the-fly variable speed is accomplished, for example, by using two separate servo motors to control the line speed of the impression cylinder and the conveying mechanism for the uncured pre-printed sheeted substrate.

In yet another embodiment of the invention, the master web is stretched varying amounts on-the-fly to ensure registration of the structured images and the printing on the sheeted substrate. This on-the-fly variable stretching of the master web is accomplished, for example, by applying a variable braking force at a nip station upstream of a powered nip roller station feeding the master web to the location at which the embossing image of the master web is nipped to the resin coating on the sheeted substrate. The level of the braking force is continuously adjusted by a computer which receives and processes a signal indicative of the extent to which the registration marks on the master and sheeted substrate are out of alignment. In yet another alternative, two or more powered nip roller stations may be used with the stations running at different varying velocities to produce the on-the-fly stretching or lengthening of the master web to maintain the alignment of the registration marks on the master and sheeted substrate.

Thus, as outlined above, the present invention includes methods and apparatus for identifying reference positions on the sheets of a sheeted substrate and registration marks associated with regularly spaced or "non-random" structured images on a master web. The sheeted substrate will have reference positions at corresponding leading and trailing edges of adjacent sheets of the sheeted substrate (or less preferably registration marks). The master web carrying structured images will have at least one registration mark and preferably a plurality of registration marks at regular intervals. The master web will typically be provided on a supply roll although it also may be in the form of a continuous belt. Where the master web is in the form of a supply roll, it may be wound up and reused so long as the impression images do not become too worn to produce satisfactory structured images.

The energy curable coating will be applied to the sheeted substrate either uniformly or in selected spots. The leading/trailing edges or registration marks of the sheeted substrate and the registration marks of the master web will be maintained in alignment as the master web is nipped to the coated sheeted substrate. This will produce an image in the top surface of the energy curable coating corresponding to the structured images on the master web. The appropriate curing energy will then be supplied to cure or harden the energy curable coating and the master will be separated from the sheeted substrate to leave registered structured images in registration with printing on the sheets of the sheeted substrate.

The images referred to herein as "structured images" include, inter alia, holographic images, varying texture images (e.g., matte film), light-diffracting devices, optical lenses, and lenticular surfaces.

The energy curable coating may be any known flowable liquid or paste resin that can be rapidly cured by the application of actinic radiation or otherwise. For example, UV curable flowable liquid resins may be used or resins curable with electron beam radiation may be used. Examples of UV curable resins include UV curable overprint varnishes, free radical and cationic curable coatings, and UV curable lithographic inks. In a preferred embodiment of the invention, the energy curable coating will be curable with actinic radiation and the master web will be transparent or translucent to permit the actinic radiation to pass therethrough to cure the energy curable coating.

The continuously maintained accurate alignment of the registration marks of the sheeted substrate and the master web is essential to the practice of the present invention. This is achieved by an apparatus including: (1) sensors that sense the leading/trailing edges or location of registration marks on the sheeted substrate and registration marks on the master web; (2) a computer programmed to monitor an error signal representing the on-the-fly deviation in the alignment of the master and sheeted substrate registration and to make a determination on-the-fly of the corresponding amount that the speed of the master web and the sheeted substrate must be varied or the master web stretched to keep the registration marks in alignment; and (3) means for achieving the appropriate speed changing/stretching to produce the desired alignment. The means for achieving this may be paired nipping stations, an independent drive for the impression cylinder, or an independent drive for the conveying mechanism of the uncured coated sheeted substrate that produces braking to slow the movement of the master web to apply a torque that will stretch the master web to the desired degree, as calculated and directed by the computer.

DETAILED DESCRIPTION OF THE INVENTION

Figure 1:
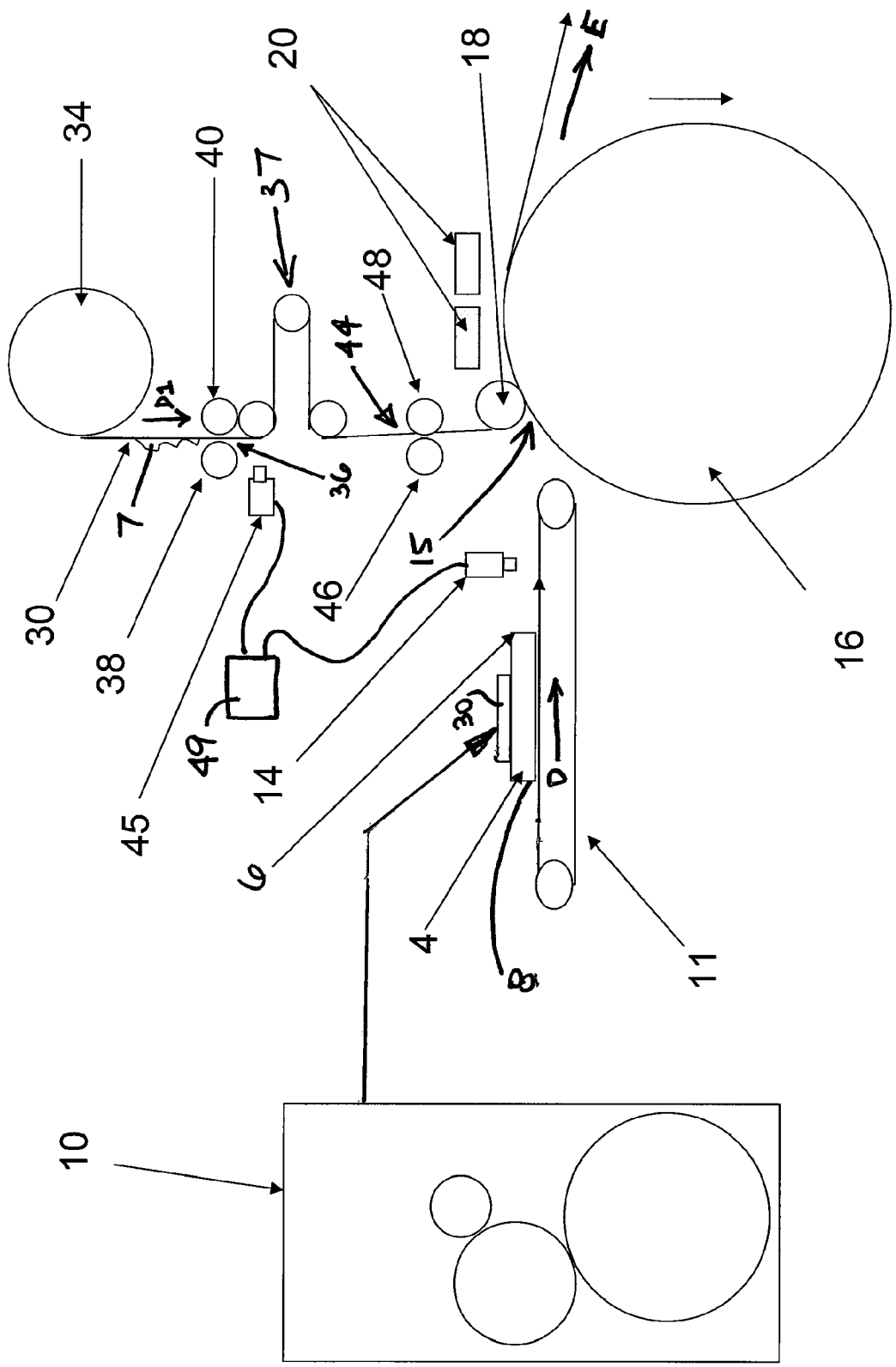
FIG. 1 is a diagrammatic representation of a system in accordance with the present invention in which registration is achieved by varying the speed of the conveying mechanism on-the-fly.

Turning now to FIG. 1, an apparatus for preparing substrate sheets 4 of a sheeted substrate with registered structured images on a master web is illustrated. The sheets may be any sheet like material that is capable of being passed through a sheet-fed-type apparatus. For example, the substrate sheets may be made of PET, paper, polypropylene, PVC, polystyrene, APET, polycarbonate, foil board, thin metal sheet, etc. Substrate sheets 4 in the illustrated embodiment are paper (enlarged for purposes of illustration) and include as reference positions the leading and trailing edges which are labeled 6 and 8 for reference.

Flowable curable resin is applied to the exposed surface of the substrate sheets by and applicator 10. The applicator may be of conventional design and may use, for example, gravure, flexographic, lithographic or silk screen techniques to apply a coating 30 of a flowable resin. Also, the resin may be applied to the sheeted substrate by combining offset and flexo applicators with different coating weight to replicate different image effects.

Coating 30 may be any known flowable liquid resin that is rapidly curable by the application of actinic radiation, including particularly UV radiation, electron beam radiation, and LED light. When LED light is used it will typically be of a wavelength in the range of 355 to 399. Examples of classes of suitable energy curable flowable liquid coatings include UV curable overprint varnishes, free radical and cationic curable coatings, curable lithographic inks, etc. Suitable commercially available energy curable coatings in these classes are available, for example, from Cork Industries, 150 Kaiser Drive, Folcroft, Pa. 60173, under the trademarks and product designations Corkcure™. Commercially available energy curable resin coatings also may be obtained from INX International, 150 North Martingale, Schaumburg, Ill. 60173, under the trademarks and product designations PROCURE™ 2009, PROCURE™ 5000, PROCURE™ UV 8005, PROCURE™ UV 1037, PROCURE™ UV 3000, PROCURE™ 5075, PROCURE™ UV 5701, INXFLEX™ Series 2000, INXFLEX™ Series 1000, INXFLEX™ ITX-Free, INXCURE™, UVEXCEL™, INXCURE™ Fusion Hybrid, INXScreen™ UV HP, and INXCURE™ UV Letter Press 1216594.

Once the sheeted substrate is coated on its top surface with coating 30, it is drawn in direction D past a first sensor 14 toward an impression cylinder 16. The coated sheets of the sheeted substrate pass through a nip point 15 located between the outer surfaces of impression cylinder 16 and a pressure roller 18. As the resin-coated sheets move along the outer circumferential surface of the impression cylinder following nip point 15, they pass under a radiation source 20 which will supply the radiation required to cure the resin coating to fix the desired structured images in the coating. Thus, where coating 30 is a UV curable coating, radiation source 20 will comprise one or more UV lamps of a power sufficient to cure the resin coating as the sheets move rapidly past the lamps. Preferably the UV lamps are located in a protective housing positioned close to the periphery of the impression cylinder 16. After the substrate sheets carrying the cured coating exit the area below the radiation source, they move in direction E where they are collected on a collection roller system (not shown).

Figure 3:
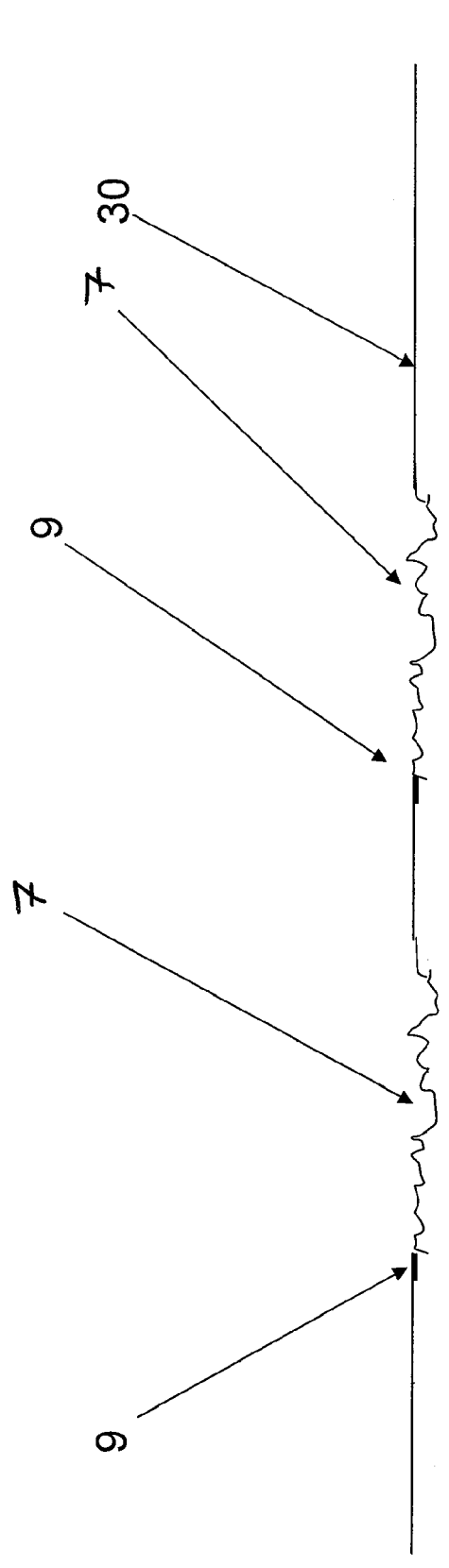
FIG. 3 is an enlarged representation of a portion of a master web used in the invention.

Turning now to the top portion of FIG. 1, a master web 30 is shown carrying a pre-formed microstructure image such as, for example, a surface relief hologram (FIG. 3) or other structured images. The master web is supplied from a supplying mechanism including an unwind and an independently driven rewind device with registration marks 9, which are shown in enlarged form in FIG. 3 to improve their visibility for purposes of describing the present invention. As noted earlier, the embossed structured images may include, for example, holographic images, varying texture images (e.g., matte film), light-diffracting devices, optical lenses, and lenticular surfaces. The master web will typically be provided on a supply roll 34 although alternatively it may be in a continuous belt form.

The master web will move in direction D1 into a tension station at first nip point 36 between rollers 38 and 40, which contact the opposite surfaces of the master web and take up any slack in the master web. Rollers 38 and 40 are supplied with a drive mechanism that will draw the master web and run at a line speed equal to or slower than the line speed of impression cylinder 16 to produce a stretch as appropriate in the master web, as explained further below.

A sensor 45 is positioned downstream of first nip point 38. This sensor is designed to determine when registration marks 9 pass the predetermined location of the sensor after passing through the first nip point. The registration marks are read and imaged through an optical path and the image information from the detected beam is continuously processed using a computer 49 programmed to generate a signal dependent upon the displacement of the successive marks 9 with respect to each other.

Master web 30 moves from first nip point 36 into a second nip point 44 located between the outer circumferential surfaces of nip rollers 46 and 48. Rollers 46 and 48 are powered and cooperate with powered rollers 38 and 40 in producing the desired degree of stretch in the master web, as it passes between the first and second nip points. An idle roll 37 also can be installed between nip stations 36 and 44 for keeping the master web from wrinkling during the stretching.

Following nip point 44, the master web passes under pressure roller 18 and through final nip point 15 along with sheets 4 of the sheeted substrate. The master web is thus nipped to the coated sheeted substrate to emboss the desired master web structured images into the surface of the uncured energy curable coating carried by the sheeted substrate. The coating is then cured to fix the image under radiation station 20 and the final product is collected on a roller or other appropriate storage structure.

Sheeted substrate 4 may be pre-printed with an image designed to receive the structured images in a desired registration with reference to registration mark 8. Alternatively, printing may be applied in-line ahead of the coating application by liquid coating station 10. It is also within the teaching of the invention to apply other converting or printing processes to the sheeted substrate after it leaves the master web.

Figure 2:
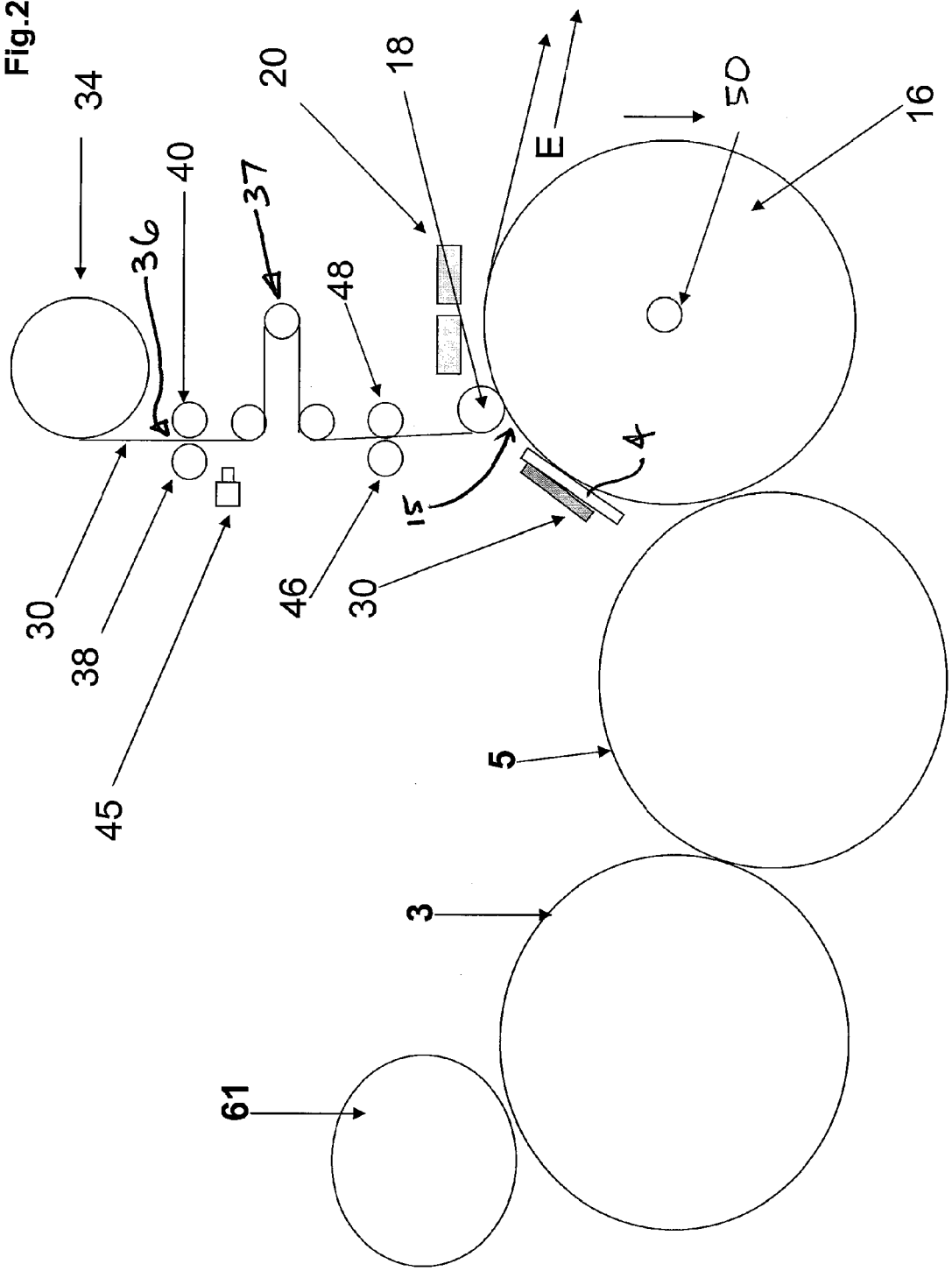
FIG. 2 is a diagrammatic representation of a system in accordance with the present invention in which registration is achieved by varying the master web tension by changing the line speed of a powered nip roller set using an encoder associated with the impression cylinder to maintain registration. This system may be configured as part of a sheet-fed press unit for tighter registration control and to meet space saving concerns.

FIG. 2 depicts an alternate embodiment of the invention in which an encoder 50 is attached to impression cylinder 16 to indicate the positions of the sheets of the sheeted substrate. This may rely on the position of the gripper bar that holds the sheet substrate, or the angle of the gripper on the impression cylinder. In this embodiment a transfer cylinder 5 may be located ahead of impression cylinder 16 to provide an interface to a conventional sheet-fed press. An impression cylinder 3 would then be located upstream of transfer cylinder 5 and equipped with a blanket cylinder 61 to apply the uncured liquid resin 30 onto the sheet substrate 4.

Figure 4:
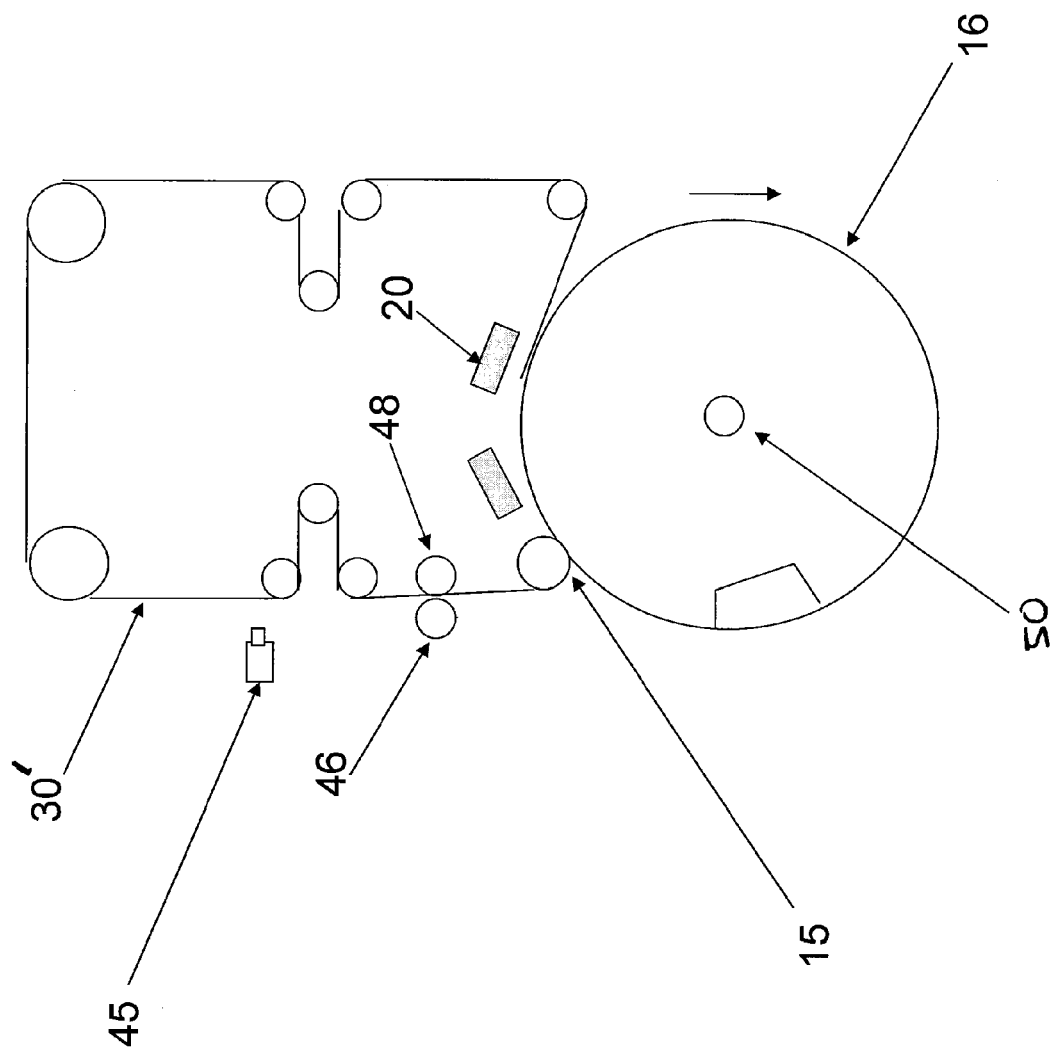
FIG. 4 is a diagrammatic representation of a system in accordance with the present invention in which the master web is in the form of a continuous belt.

The embodiment of FIG. 4 generally parallels that of FIG. 2 except that the master web is in the form of a continuous belt 30' and an encoder 50 is provided to indicate registration of the sheeted substrate.

Figure 5:
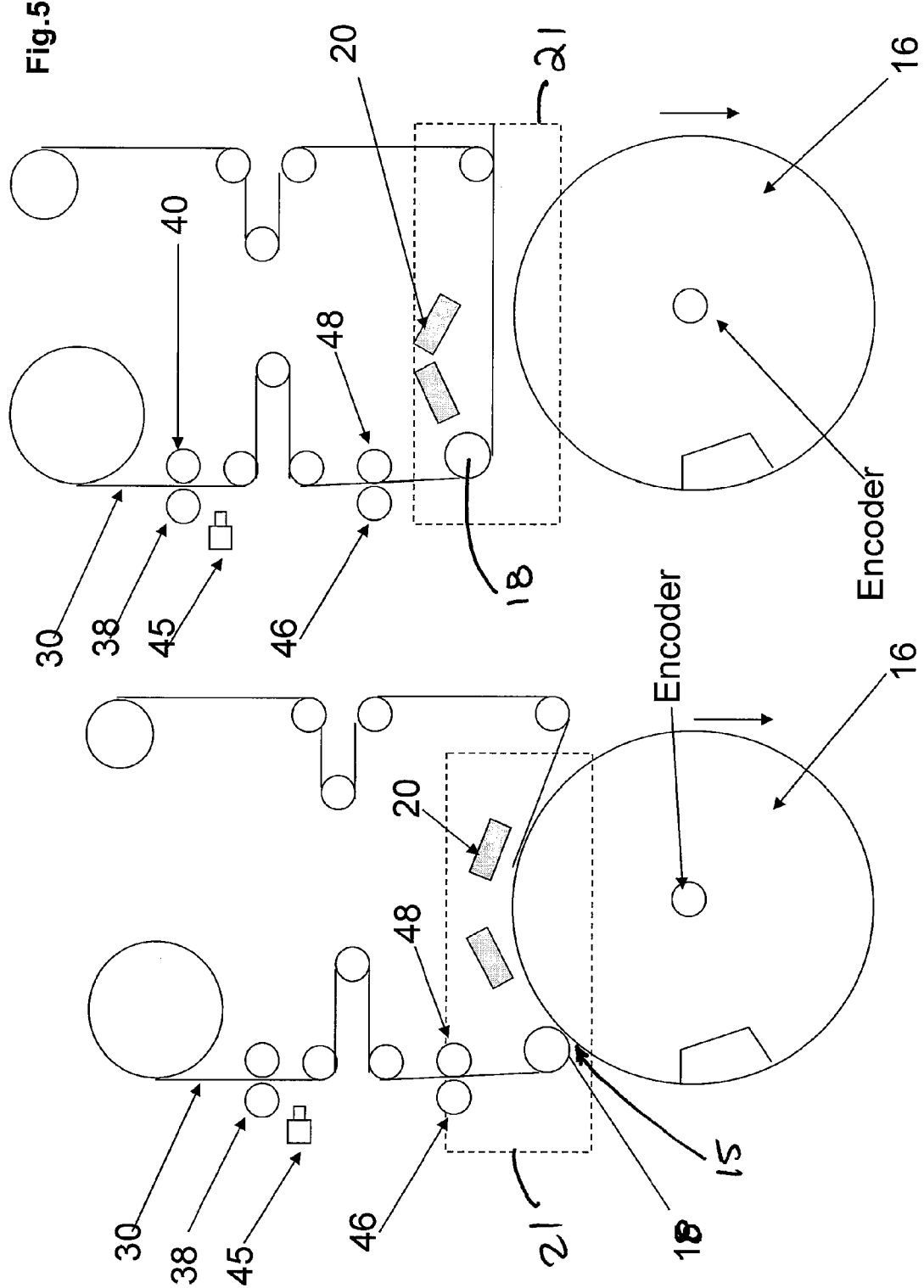
FIG. 5 is a diagrammatic representation of a system in accordance with the present invention in which a sub-side frame is installed and lifted for minimizing waste during idle periods.

FIG. 5 is a diagrammatic representation of a main sideframe with a sub-sideframe 21 that can be maintained in a lifted position as shown to the right in this figure and then moved into place as shown on the left when the resin coater is ready to apply the resin coat in a production mode. Thus, when pressure roller 18 is in contact with the impression cylinder as illustrated at the left in FIG. 5, the master web will be consumed as the impression cylinder rotates during the makeready mode. However, when sub-sideframe 21 is raised (left side of FIG. 5) before production begins the impression cylinder will be able to turn without wasting master web or sheeted substrate.

Figure 6:
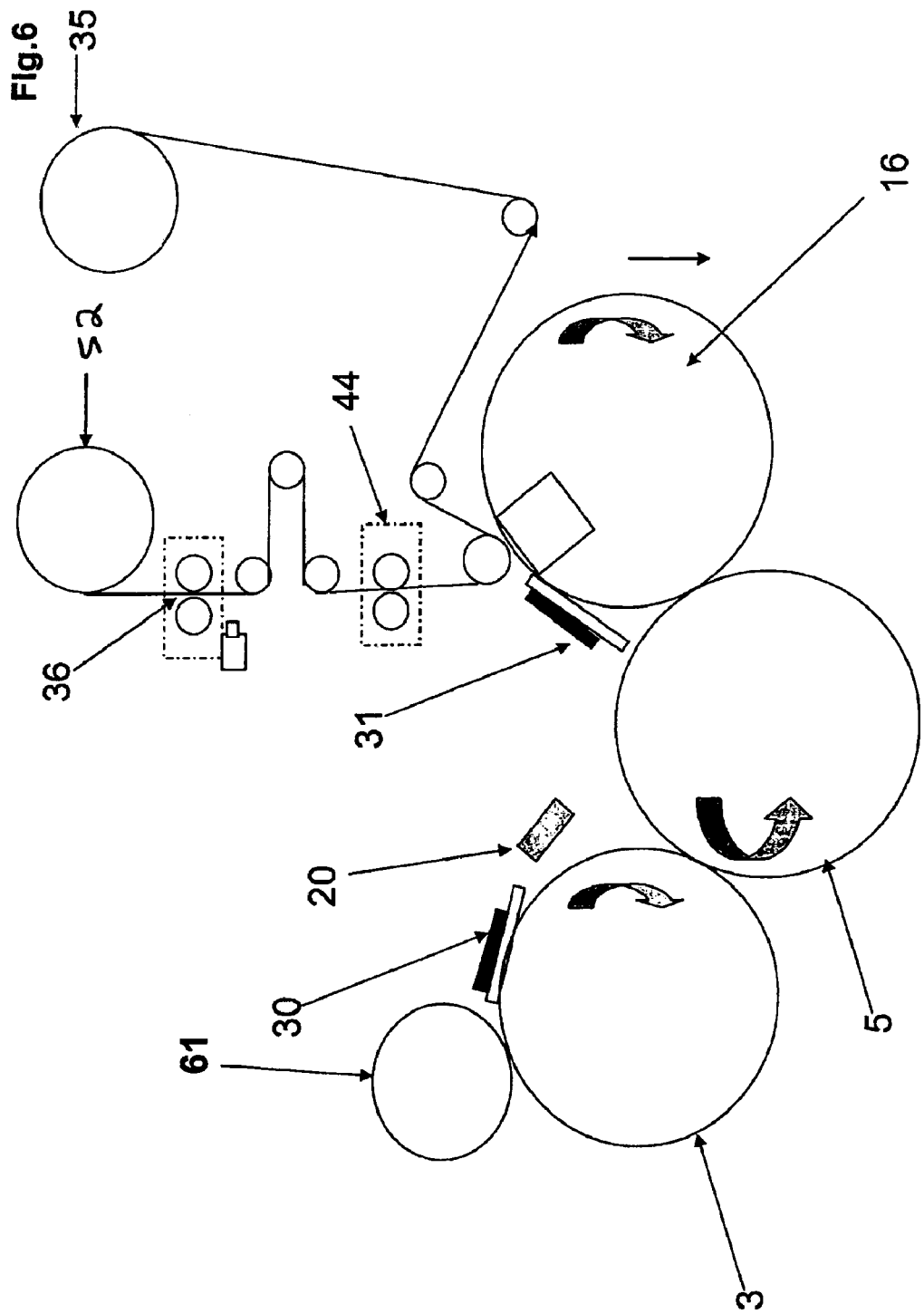
FIG. 6 is a diagrammatic representation of a system in accordance with the present invention in which cold foiling is achieved by laminating foil with a curable pressure sensitive adhesive that is cured prior to the final nip point 15.

FIG. 6 illustrates an embodiment of the invention entailing laminating the sheeted substrate to cold foil. Thus, once the curable adhesive is cured it may be laminated with cold foil from cold foil roll 52 as illustrated in FIG. 6. A better defined cold foiling effect can be achieved with reduced spread from a cured adhesive 31 than the uncured adhesive 30 applied from the blanket cylinder 61 on the previous unit and transferred by cylinder 5 to cylinder 16.

Figure 7:
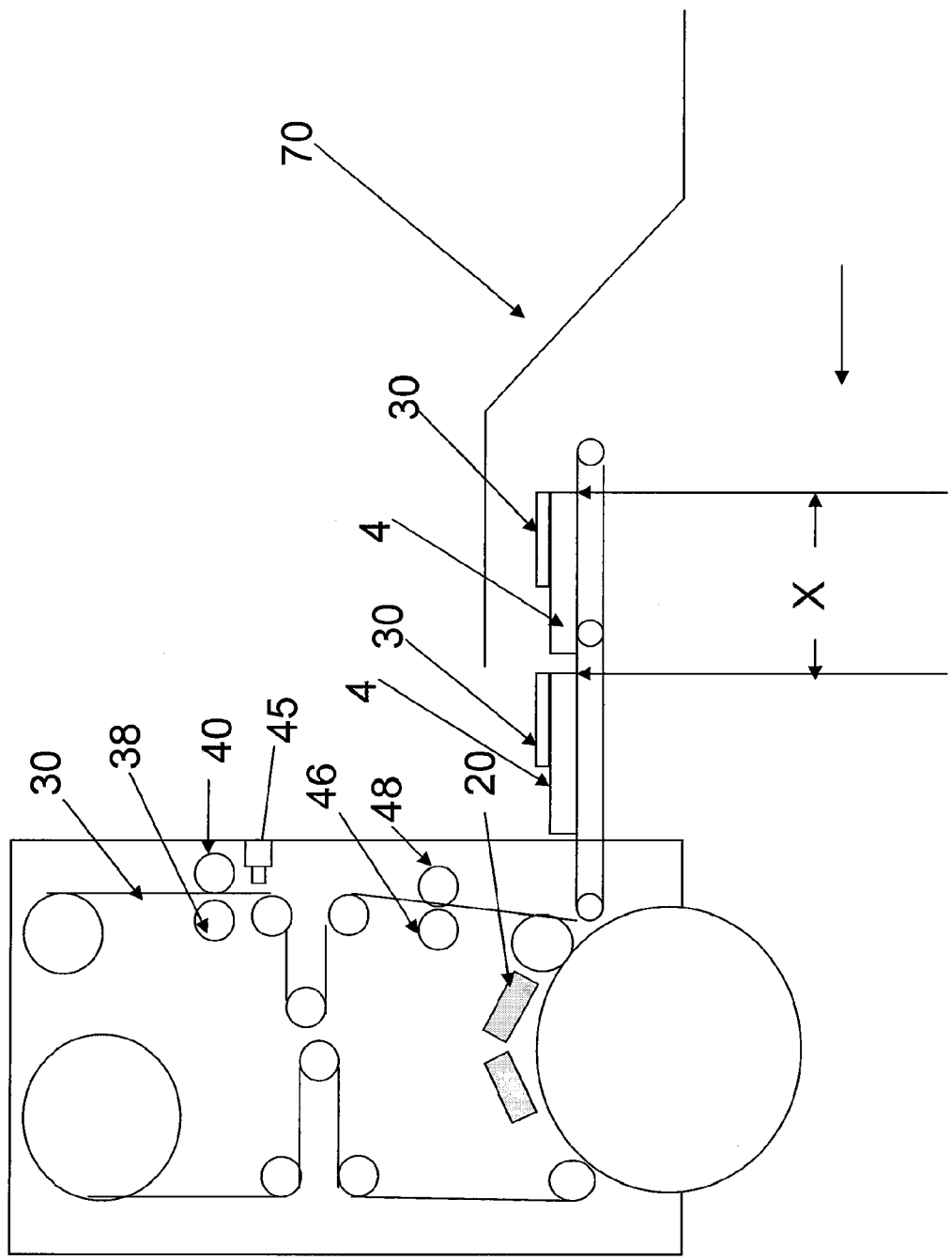
FIG. 7 is a diagrammatic representation of a system in accordance with the present invention in the form of a mobile unit that is positioned downstream of a sheet-fed delivery section without a direct mechanical link to the coating apparatus. This helps to save foiling/casting material by bringing sheet substrates closer if the sheet length in the paper travel direction is much shorter than the distance between grippers.

In FIG. 7 a mobile unit without a direct mechanical link to a sheet-fed coating press is positioned downstream of a sheet-fed delivery unit 70 to help save foil or master web by bringing the sheeted substrates 4 closer than the gripper distance if the sheet length in the sheet travel direction is much shorter than the distance between grippers. This concept can substantially reduce consumption of the master web or cold foil by eliminating unnecessary travel of the master film or cold foil.

Figure 8:
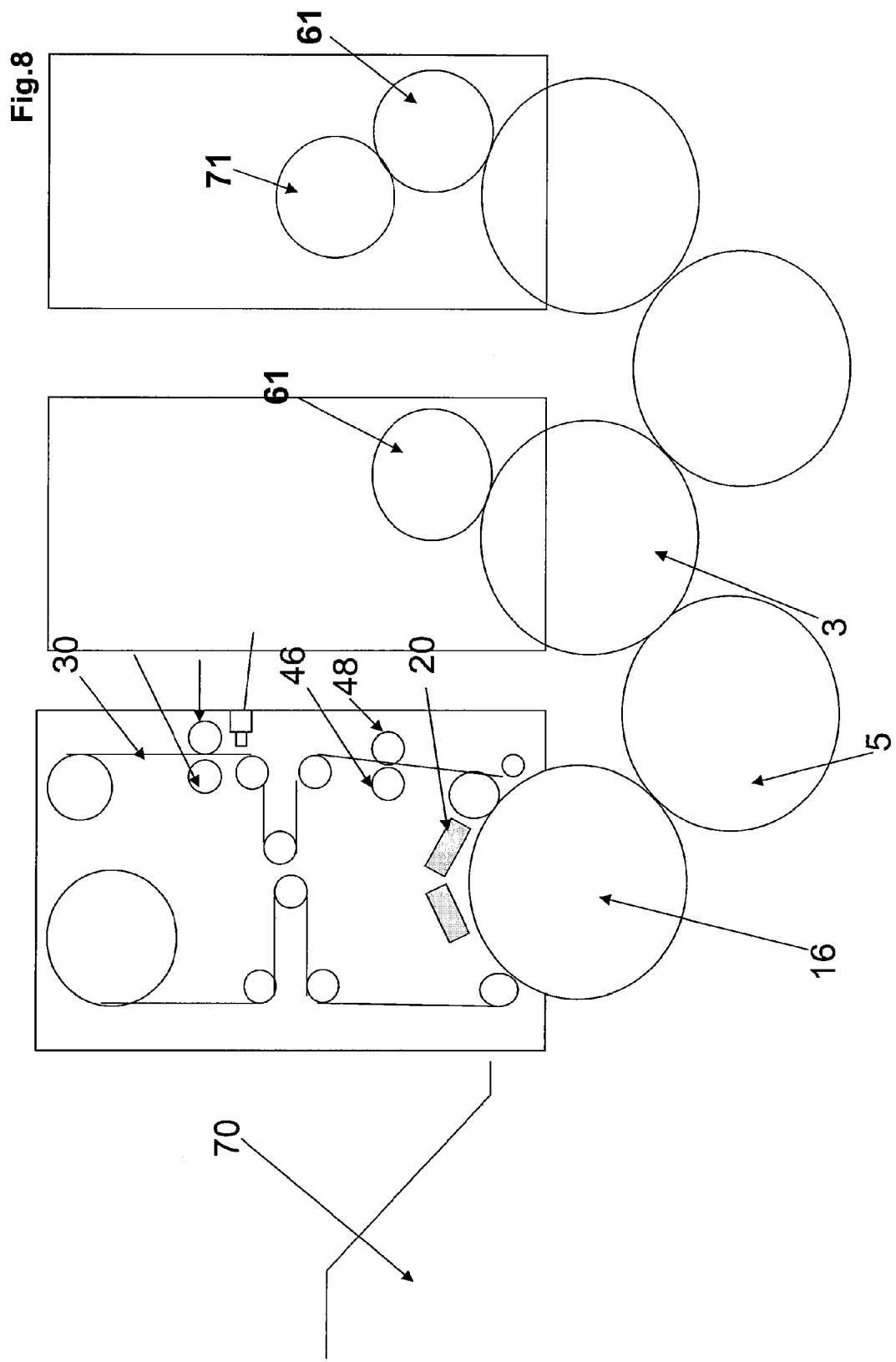
FIG. 8 is a diagrammatic representation of an integrated system in accordance with the present invention with the master web stretching apparatus fitted to a sheet-fed platform before delivery.

Printers and converters are always looking for integrated system modules for tighter space and controls. The system illustrated in FIG. 8 thus represents an inline system in accordance with the present invention fitted in between a sheet-fed delivery section 70 and a coating unit configured with a blanket applicator 61 on top of an impression cylinder 3. Coating weight variation will also affect the strength of replication, and thus a thinner coat weight applied by offset plate 71 will produce a subtler effect than a coat weight applied by blanket applicator 61.

Figure 9:
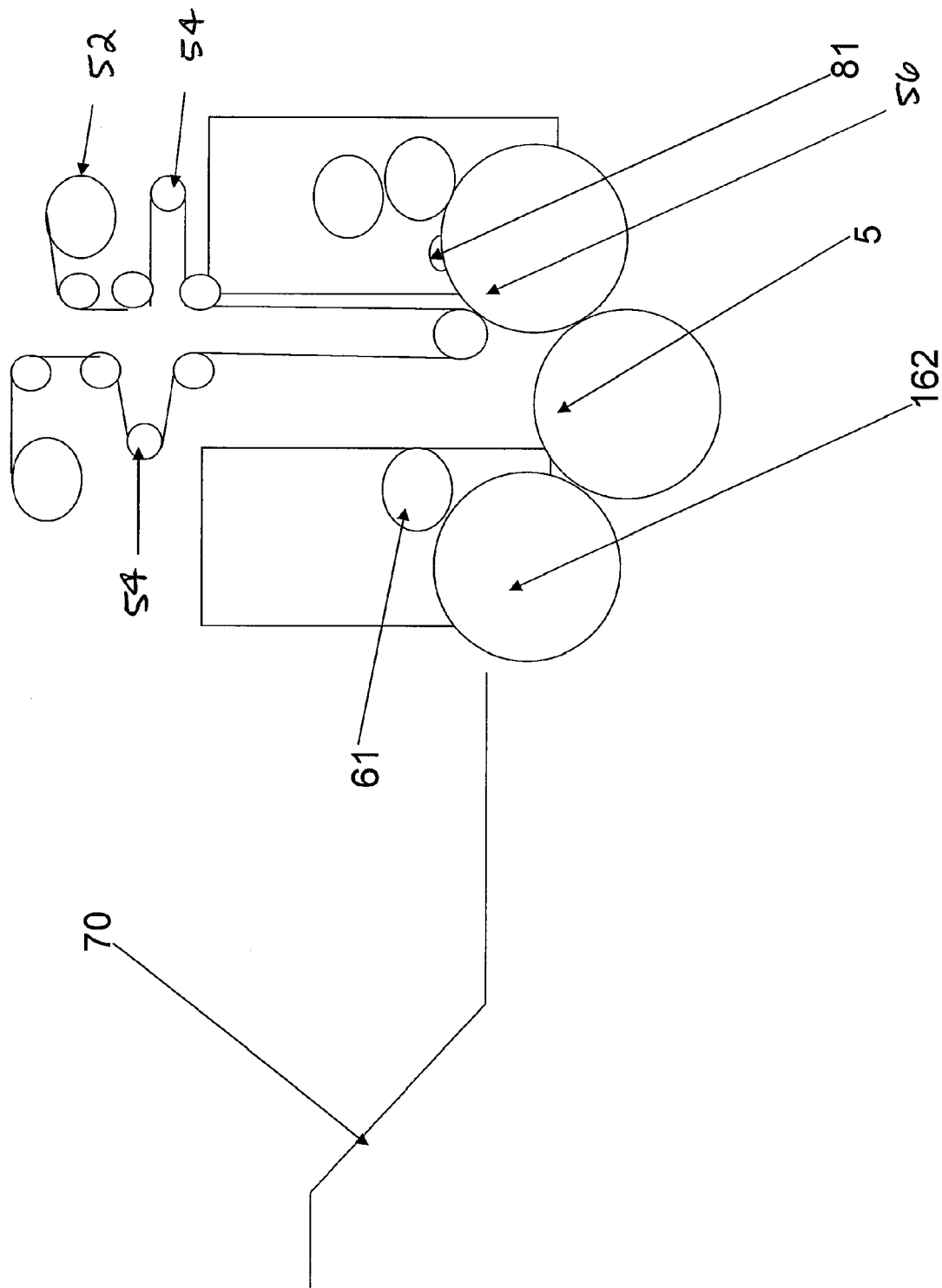
FIG. 9 is a diagrammatic representation of a system in accordance with the present invention sharing the impression cylinder from a print unit for cold foiling before the delivery. This will help printers to save foil as a result of the lifting mechanism for lifting the pressure roller.

FIG. 9 is a diagrammatic representation of a system in accordance with the present invention in which the impression cylinder 54 from a print unit is shared for cold foiling before the delivery from sheet-fed press section 70. This system will not only save a print unit than other offset cold foiler but also will help printers to save foil from cold foiler roll 52 once a cam 81 is installed on the impression cylinder 56 or other lifting mechanism is provided. When lifting mechanism/cam lifts the pressure roll 18 while the grippers pass, this lifting motion will allow either cold foil or master web not to travel with the shared impression cylinder 56 and both dancer rollers 54 will compensate the web to maintain the web tension until the pressure roller comes down. This configuration will substantially save foil or master web consumption.

Figure 10:
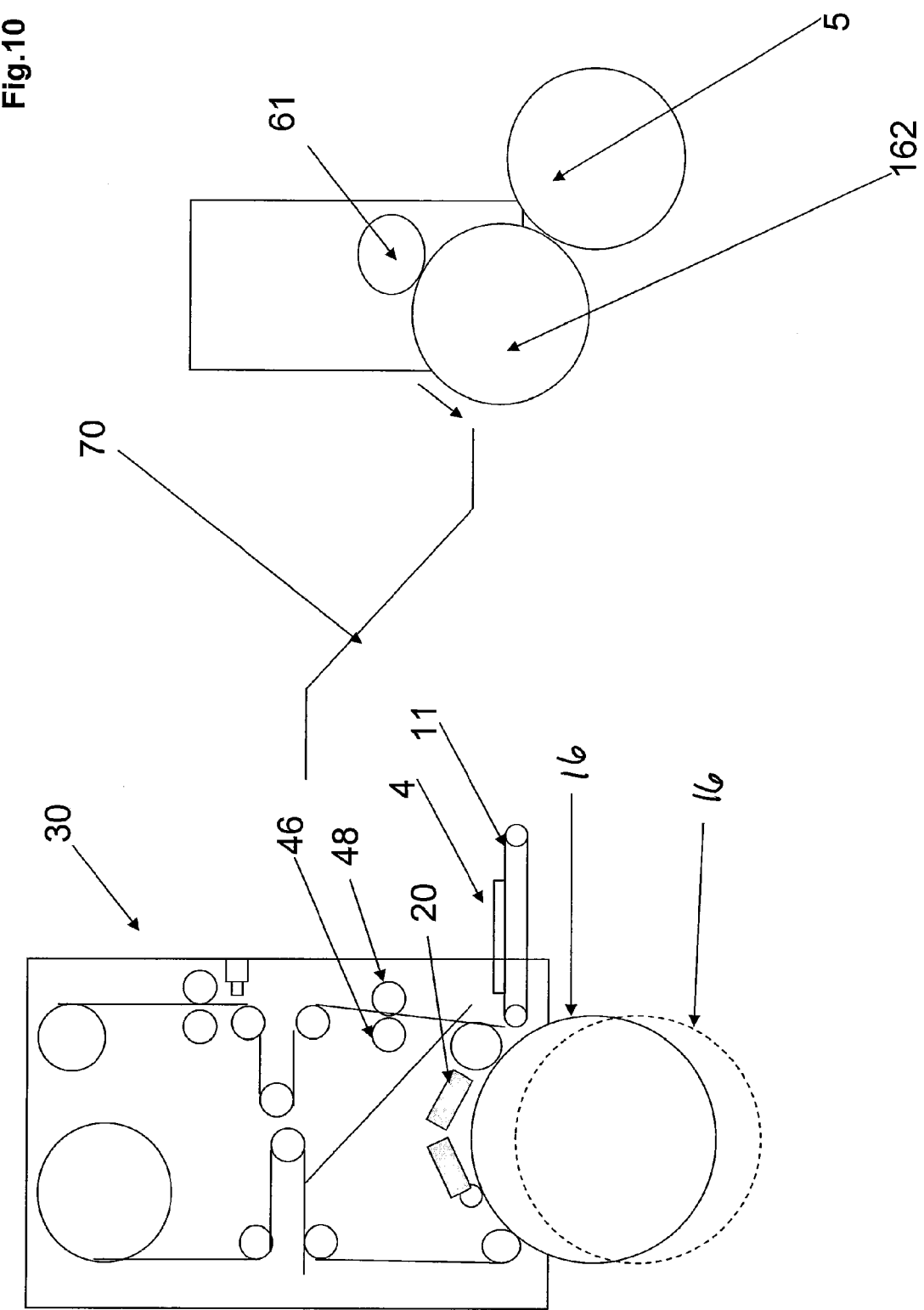
FIG. 10 is a diagrammatic representation of a system in accordance with the present invention using an impression cylinder that can be moved downwardly to create a passage for sheeted substrate passing therethrough without wasting the master web to hold the sheet substrate.

FIG. 10 illustrates an embodiment of the invention in which impression cylinder 16 has no grippers and can be moved downwardly to create a straight passage for the sheeted substrate to travel above the impression cylinder 16 without consuming master web 30 or holding sheets 4 around impression cylinder 16. By moving the impression cylinder 16 downwardly (as indicated in broken line) this will enable converters to better utilize the original coating unit 61 by passing sheets 4 through impression cylinder 16 without consuming the master web 30. This passage will also allow printers to bring sheeted substrate past the impression cylinder free of the master web.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A system for preparing sheeted substrate with a registered cast image comprising:
   a) a master web supplying mechanism;
   b) a master web with registration marks with a distance between registration marks on the master web being equal or less than a fixed distance between sheets;
   c) a resin coated sheeted substrate in a form of a series of spaced sheets with leading or trailing edges acting as reference positions;
   d) an independently driven first nip roller set acting as a pulling roller set that defines a first nip point for the master web downstream from an unwind of the master web roll that travels at a slower or equal line speed relative to a line speed of a final nip point;
   e) an independently driven second nip roller set acting as a stable roller set that creates a second nip point for the master web downstream from the first nip point and that travels at a same line speed as the line speed of a final nip point;
   f) a pressure roller that nips the master web and the resin coated sheeted substrate against a power driven impression cylinder;
   g) a powered conveying mechanism located prior to the impression cylinder to carry the resin coated sheeted substrate to the final nip point;
   h) a device for curing a coated resin on the resin coated sheeted substrate;
   i) a first sensor to detect registration marks on the master web;
   j) a second sensor for detecting reference positions of the resin coated sheeted substrate; and
   k) a computing system to calculate a timing of each registration mark to the final nip point at which the master web is nipped to the resin coated sheeted substrates and varying a relative speed between the master web and the resin coated sheeted substrate to synchronize respective registration marks as the respective registration marks reach the final nip point.

2. The system of claim 1 including idle rollers for changing a path of master web to fit various applications.

3. The system of claim 1 in which the master web supplying mechanism includes an unwind and an independently driven rewind device.

4. The system of claim 1 in which the resin coated sheeted substrate is chosen from the group consisting of plastic, paper, wood and metal.

5. The system of claim 1 in which the registered cast image is chosen from the group consisting of holographic images, texture images, light-diffracting patterns, optical lenses, and lenticular surfaces.

6. The system of claim 1 in which the coated resin is chosen from the group consisting of UV radiation curable and electron beam radiation curable resins.

7. The system of claim 1 in which the coated resin is curable with actinic radiation and the master web is transparent or translucent to permit the actinic radiation to pass therethrough to cure a resin coating.

8. The system of claim 1 in which registration between the resin coated sheeted substrate and the master web is maintained by varying the relative speed of the master web and the resin coated sheeted substrate.

9. The system of claim 8 in which the relative speed between the resin coated sheeted substrate and the master web is varied by stretching the master web.

10. The system of claim 8 in which the relative speed between the resin coated sheeted substrate and the master web is varied by adjusting a speed of the master web supplying mechanism carrying the resin coated sheeted substrate.

11. The system of claim 8 in which the relative speed between the resin coated sheeted substrate and the master web is varied by adjusting a line speed of the powered conveying mechanism prior to the final nip point.

12. The system of claim 1 in which the coated resin is applied, to the resin coated sheeted substrate by an application method chosen from a group consisting of offset, silk screen, ink jet, gravure and flexo applications.

13. The system of claim 1 in which a reference position of the resin coated sheeted substrate is chosen from a group consisting of the leading edge of the resin coated sheeted substrate, the trailing edge of the resin coated sheeted substrate, a gripper bar that holds the resin coated sheet substrate, or an angle of a gripper on the impression cylinder.

14. The system of claim 1 in which the master web is in a continuous belt form.

15. The system of claim 1 in which images on the master web have a repeat length between registration marks greater than the resin coated sheeted substrate but smaller than a distance between the leading edge of each sheet to the leading edge of a next adjacent sheet.

16. The system of claim 1 in which the coated resin is applied to the resin coated sheeted substrate by combining offset and flexo applicators with different coating weight to replicate different image effects.

* * * * *